US007830816B1

(12) United States Patent
Gonzalez et al.

(10) Patent No.: US 7,830,816 B1
(45) Date of Patent: Nov. 9, 2010

(54) NETWORK ACCESS AND QUALITY OF SERVICE TROUBLESHOOTING

(75) Inventors: Jose A. Gonzalez, Maitland, FL (US);
David M. Ham, Ashburn, VA (US);
Brian Lushear, Orlando, FL (US); Matt Mariscal, Winter Park, FL (US); Steve D. Parrott, Clifton, VA (US); Drew A. Shinholster, Jr., Maitland, FL (US);
Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/838,175

(22) Filed: Aug. 13, 2007

(51) Int. Cl.
*H04L 1/00* (2006.01)
(52) U.S. Cl. ...................... 370/252; 370/245
(58) Field of Classification Search ............... 370/245, 370/252, 216, 237; 709/223
See application file for complete search history.

(56) References Cited

U.S. PATENT DOCUMENTS

| | | | |
|---|---|---|---|
| 6,046,988 A * | 4/2000 | Schenkel et al. ............ 370/254 |
| 6,570,867 B1 * | 5/2003 | Robinson et al. ............ 370/351 |
| 6,792,273 B1 | 9/2004 | Tellinger et al. |
| 6,813,634 B1 | 11/2004 | Ahmed |
| 6,973,042 B1 * | 12/2005 | Fitzgerald ................... 370/249 |
| 6,978,223 B2 * | 12/2005 | Milliken ..................... 702/182 |
| 7,099,912 B2 * | 8/2006 | Ishizaki et al. .............. 709/201 |
| 7,110,362 B2 * | 9/2006 | Kato ...................... 370/236.1 |
| 7,143,152 B1 * | 11/2006 | Elman et al. ................ 709/223 |
| 7,376,719 B1 | 5/2008 | Shafer et al. |
| 7,376,864 B1 | 5/2008 | Hu et al. |
| 7,424,526 B1 | 9/2008 | Hansen et al. |
| 7,467,225 B2 * | 12/2008 | Anerousis et al. ........... 709/238 |
| 2002/0078232 A1 | 6/2002 | Simpson et al. |
| 2002/0087393 A1 * | 7/2002 | Philonenko .................. 705/11 |
| 2002/0103921 A1 | 8/2002 | Nair et al. |
| 2002/0164007 A1 | 11/2002 | Henits |
| 2002/0181047 A1 | 12/2002 | Lauder et al. |
| 2003/0055972 A1 * | 3/2003 | Fuller et al. ................ 709/226 |
| 2004/0064581 A1 | 4/2004 | Shitama et al. |
| 2004/0071164 A1 | 4/2004 | Baum |
| 2005/0240835 A1 | 10/2005 | Dragnea et al. |
| 2006/0215577 A1 * | 9/2006 | Guichard et al. ............ 370/254 |

(Continued)

OTHER PUBLICATIONS

Gonzalez, Jose, et al., "Integrated Network and Customer Database", U.S. Appl. No. 11/551,704, filed Oct. 21, 2006.

(Continued)

*Primary Examiner*—Nick Corsaro
*Assistant Examiner*—Sowmini Nair (57) ABSTRACT

A method of maintaining a communication service is disclosed. The method comprises providing a communication path from a customer premises equipment (CPE) in a customer network to a port of a router located in a communication service provider network, wherein the port is allocated to the CPE, and wherein the customer network is different from the communication service provider network. The method also comprises determining a connectivity of the communication path from the CPE to the port of the router and determining an interface status of the port located on the router. The method also comprises determining a quality of service (QoS) of the communication path from the CPE to the port located on the router. Determining the connectivity and QoS of the communication path and determining the interface status of the port are initiated from the CPE.

15 Claims, 5 Drawing Sheets

U.S. PATENT DOCUMENTS

2006/0268740 A1\* 11/2006 Rosenberg et al. .......... 370/254
2007/0041554 A1\* 2/2007 Newman et al. ....... 379/218.01
2007/0250625 A1\* 10/2007 Titus .......................... 709/224
2007/0274285 A1 11/2007 Werber et al.

OTHER PUBLICATIONS

Gonzalez, Jose, et al., "Customer Link Diversity Monitoring", U.S. Appl. No. 11/620,140, filed Jan. 5, 2007.

Hame, David M., et al., "Flexible Grouping for Port Analysis", U.S. Appl. No. 12/036,289, filed Feb. 24, 2008.

Final Office Action dated Aug. 13, 2009, U.S. Appl. No. 11/551,704, filed Oct. 21, 2006, 22 pages.

Office Action (Advisory Action) dated Oct. 16, 2009, U.S. Appl. No. 11/551,704, filed Oct. 21, 2006, 3 pages.

Office Action dated Mar. 2, 2009, U.S. Appl. No. 11/551,704, filed Oct. 21, 2006, 16 pages.

Office Action dated Jun. 15, 2009, U.S. Appl. No. 11/620,140, filed Jan. 5, 2007, 16 pages.

Notice of Allowance dated Mar. 22, 2010, U.S. Appl. No. 11/620,140, filed Jan. 5, 2007, 10 pages.

Advisory Action dated Feb. 17, 2010, U.S. Appl. No. 11/620,140, filed Jan. 5, 2007, 3 pages.

Office Action dated Dec. 31, 2009, U.S. Appl. No. 11/551,704, filed Oct. 21, 2006, 30 pages.

Office Action—First Action Interview Pilot Program Pre-Interview Communication dated Apr. 2, 2010, U.S. Appl. No. 12/036,289, filed Feb. 24, 2008, 31 pages.

Office Action dated May 20, 2010, U.S. Appl. No. 11/551,704, filed Oct. 21, 2006, 33 pages.

Final Office Action datd Nov. 27, 2009, U.S. Appl. No. 11/620,140, filed Jan. 5, 2007, 17 pages.

\* cited by examiner

NETWORK ACCESS AND QUALITY OF SERVICE TROUBLESHOOTING

CROSS-REFERENCE TO RELATED APPLICATIONS

This application includes subject matter related to U.S. patent application Ser. No. 11/551,704, filed Oct. 21, 2006, entitled "Integrated Network and Customer Database," by Jose Gonzalez, et al, which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business may subscribe to a variety of communication services provided by one or more service providers who operate owned or leased telecommunications equipment. The subscriber may be provided access to the public communications network by a local exchange carrier (LEC) which provides one or more dedicated lines to each subscriber from a switch. The traffic from multiple subscribers may be switched by the LEC to share a common resource according to statistical multiplexing techniques or some other process. Alternatively, a subscriber may be allocated a dedicated line, for example a T-1 resource, on a continuous basis rather than a switched basis.

The subscriber may obtain connectivity to the Internet by subscribing to an Internet service provided by an Internet service provider (ISP). The ISP may provide this Internet service with a port on a router operated by the ISP. The port on the router may be dedicated or reserved primarily or completely for the use of the subscriber. The subscriber connectivity to the Internet may be provided by a first communication link from the subscriber to the LEC switch and by a second communication link from the LEC switch to the port on the router. Alternatively, the subscriber connectivity to the Internet may be provided directly or indirectly by a single communication link from the subscriber to the port on the router. A router is an electronic device that provides connectivity between two networks and typically supports routing of data packets to other network nodes based on addresses embedded in the header of the data packets.

The communication services may be defined, at least in part, by a service level agreement (SLA) that may define a class of service, a bandwidth, and other key communication parameters. A SLA may also define service availability, time to identify the cause of a customer affecting malfunction, time to repair a customer affecting malfunction, service provisioning time, and other. A quality of service (QoS) and/or a class of service associated with the communication service may be implied by the SLA.

A communication service subscribed to by some enterprises is the virtual private network (VPN) communication service. VPNs may be used by enterprises to communicate confidentially within the enterprise, between different sites, offices, or campuses, over a public communications network. VPN traffic can be carried over a public network infrastructure, such as the Internet, on top of standard protocols, or over a service provider's private network with a defined SLA between the subscriber and the service provider. A VPN can send a variety of communications traffic including data, voice, video, or a combination of these and other traffic. In some cases, VPNs may be provided based on multi-protocol label switching (MPLS) techniques.

SUMMARY

In an embodiment, a method of maintaining a communication service is disclosed. The method comprises providing a communication path from a customer premises equipment (CPE) in a customer network to a port of a router located in a communication service provider network, wherein the port is allocated to the CPE, and wherein the customer network is different from the communication service provider network. The method also comprises determining a connectivity of the communication path from the CPE to the port of the router and determining an interface status of the port located on the router. The method also comprises determining a quality of service (QoS) of the communication path from the CPE to the port located on the router. Determining the connectivity and QoS of the communication path and determining the interface status of the port are initiated from the CPE.

In another embodiment, a method of troubleshooting a communication service is disclosed. The method comprises providing the communication service to a customer premises equipment (CPE) located in a customer network, wherein the communication service is provided, at least in part, by a port of a router, wherein the router is located in the communication service provider network, and wherein the communication service is provided according to a class of service. The method also comprises receiving a first request for a status of the communication service from the customer network, wherein the status of the communication service is at least one of a connectivity status of the communication service, an interface status of the port of the router, and a quality of service (QoS) status of the communication service. The method further comprises polling the router to determine at least part of the status of the communication service and sending a first reply to the customer network, wherein the first reply is based on the first request for the status of the communication service and on polling the router, to promote troubleshooting the communication service by a customer.

In yet another embodiment, a method of confirming a communication service is provided. The method comprises providing the communication service to a customer premises equipment (CPE) located in a customer network, wherein the communication service is provided in part by a switch in a first service provider network, and wherein the communication service is further provided in part by a port of a router located in a second service provider network. The customer network is different from the first and second service provider networks. The method also comprises determining a connectivity of the communication service from the CPE through the switch to the port of the router and determining a quality of service (QoS) of the communication service. The method further comprises comparing the QoS of the communication service with a service level agreement (SLA) associated with the communication service, thereby confirming the communication service. Determining the connectivity and QoS of the communication service are initiated by a subscriber of the communication service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure provides a system and methods to provide transparency of the condition and/or status of a communication service, thereby promoting maintaining, troubleshooting, and service verification by a communication service subscriber and/or lower level, less skilled employees of a provider of the communication service. The subscriber is provided real time access to interface status, latency statistics, quality of service (QoS) statistics, and connectivity data by a graphical user interface (GUI) that, in one embodiment, invokes a simple network management protocol (SNMP) poll of a port on a router which provides the communication service, for example a virtual private network (VPN) resource. In another embodiment, a secure shell (SSH) interface may be employed to access information from the port on the router. Yet other methods of obtaining the information from the port on the router are contemplated by this disclosure. These novel methods may enable the subscriber to verify or confirm that a recently contracted communication service has been brought into service and is provisioned to support the QoS and/or class of service implied by the service level agreement (SLA) defined in the subscription contract. In some contexts this may be referred to as service assurance. These methods may also enable the subscriber to maintain and troubleshoot the communication service after initial delivery of the communication service. The ability of the subscribers to serve themselves provided by these methods may save the time of employees of the service provider who otherwise might have to hand-hold the subscriber through the service confirmation, maintenance, and troubleshooting processes. Similarly, the ability of the subscribers to serve themselves provided by these methods may reduce delays that subscribers might otherwise experience while waiting for attention from staff of the service provider. As mentioned above, the disclosed system and methods also may be used by an employee of a provider of the communication service and may promote, for example, customer facing employees of the provider of the communication service replying in real time to customer questions about contracted or purchased communication services. Additionally, the disclosed system and methods may reduce the number of employees of the provider of communication services who are involved in answering customer questions about communication services and/or troubleshooting communication services provided to customers.

Figure 1:
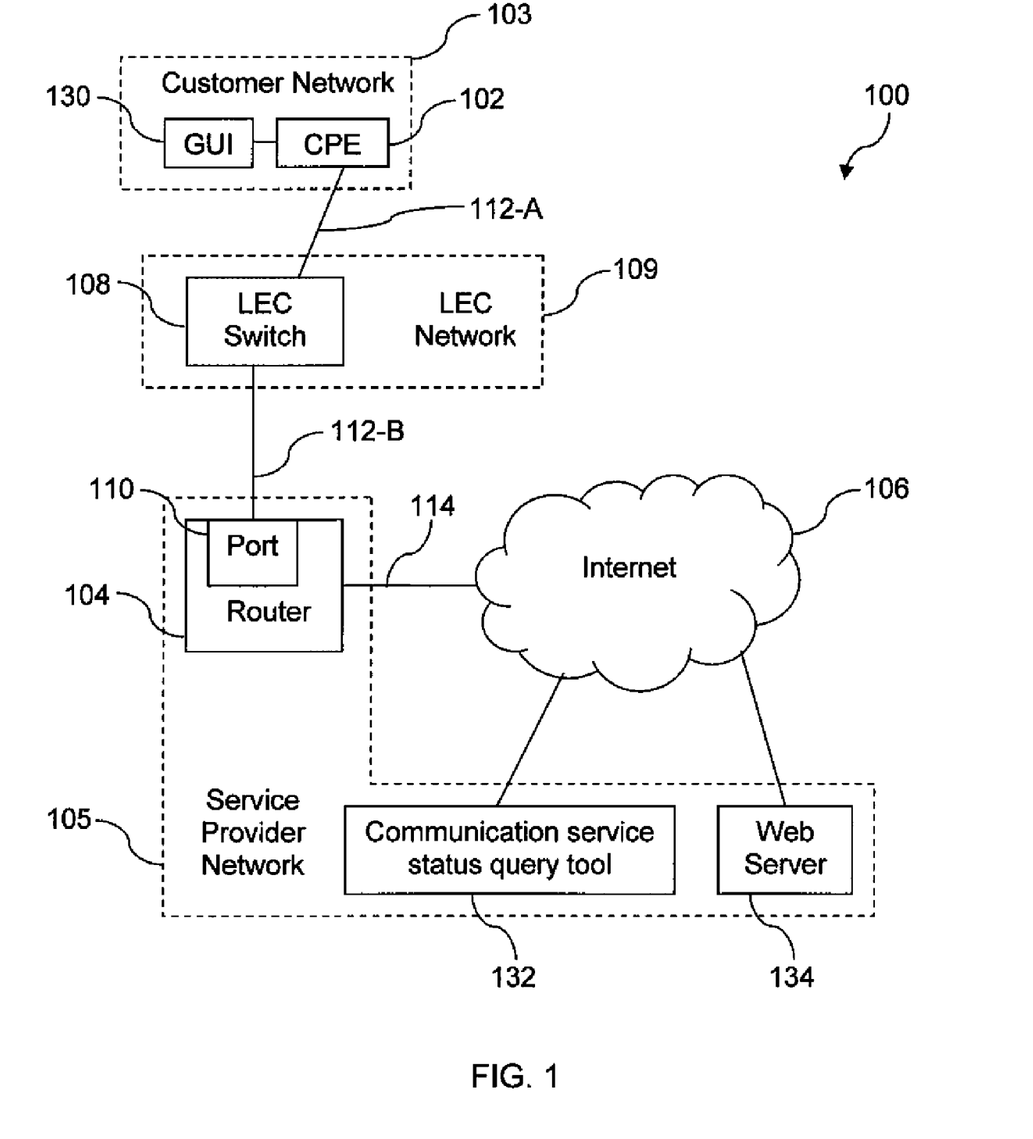
FIG. 1 is an illustration of a communication service and troubleshooting environment suitable for implementing the several embodiments of the disclosure.

Turning now to FIG. 1, a system 100 is discussed that illustrates one or more embodiments of the disclosure. The system 100 includes customer premises equipment (CPE) 102 in communication with a router 104 that provides connectivity to the Internet 106 to the CPE 102. The CPE 102 may be located in a customer network 103, and the router 104 may be located in a communication service provider network 105, also referred to as a service provider network. In an embodiment, the Internet connectivity may be provided through a local exchange carrier (LEC) switch 108 located in a LEC network 109. The Internet connectivity or other communication service may be provided by a port 110 on the router 104. The port 110 may be dedicated to the use of the CPE 102 or may be shared by a plurality of CPEs 102.

The communication service may be provided, in part, by a communication path 112. In an embodiment, the communication path 112 may include a first link 112-A from the CPE 102 to the LEC switch 108 and a second link 112-B from the LEC switch 108 to the router 104. The router 104 may provide access to the Internet 106 via a third link 114. Thus, the CPE 102 may access the Internet 106, for example accessing content from a content server (not shown) via the communication path 112 from the CPE 102 to the router 104 and via the third link 114 from the router to the Internet 106, where the content server (not shown) is connected to the Internet 106. While the communication service is promoted by the Internet connectivity, a variety of different communication services may be provided by such Internet connectivity. The communication service may include one or more of VPN service, email service, multimedia communication service, video conferencing service, voice communication service, and other communication services.

While a single communication path 112 is depicted in FIG. 1, in some embodiments multiple communication paths 112 may be employed to provide the communication service, for example depending on the communication volume associated with the communication service. In some embodiments, multiple communication paths 112 may be supported by one port 110 of the router 104. In another embodiment, depending on the communication volume associated with the communication service, multiple communication paths 112 may be supported by two or more ports 110 of the router 104.

The CPE 102 is located in the customer network 103 and may comprise a gateway, a hub, a modem, or other device for promoting data communications. The CPE 102 may be linked to a local area network (LAN) (not shown) in the customer network 103 that connects a plurality of computers within the customer network 103. The CPE 102 may provide devices or computers connected to the CPE 102 with access to the Internet 106 via the communication service. In another embodiment, however, the CPE 102 may be different from the above described exemplary configuration.

A graphical user interface (GUI) 130 provides access to a query tool 132. The GUI 130 may be presented on a display linked to a variety of computers and work stations in the customer network 103. In an embodiment, the GUI 130 may provide one or more buttons that select an asynchronous JAVASCRIPT request (AJAX) to be sent to a web server 134 via the Internet connectivity, for example from the computer presenting the GUI 130 over a LAN connection to the CPE 102, over the communication path 112 to the port 110 of the router 104, over the third link 114 to the Internet 106, and via the Internet 106 to the web server 134. The AJAX message may include one or more queries related to the status of the communication service, the communication path 112, the router 104, and/or the port 110. For example, the status queries may include an interface status query, a QoS status query, a connectivity status query, a latency query, and other status queries. Based on the response to these status queries, the subscriber may obtain a transparent view into the communication service that enables them to verify, maintain, and troubleshoot the communication service. In an embodiment, key operational parameters or information related to the communication path 112, the router 104, and/or the port 110 may be displayed highlighted, bolded, or otherwise emphasized in the GUI 130 to aid in assimilating the information provided.

The router 104 may be a general purpose computer system provided with software and interfaces that promote routing and forwarding of data packets. In some embodiments, the router 104 may contain a specialized operating system, such as the IOS, the JUNOS, or the XOS operating systems. In other embodiments, however, the router 104 may employ a general purpose operating system, such as the UNIX, the LINUX, or the WINDOWS operating systems. In some contexts, the router 104 may be referred to as a network switch, a layer 3 switch, or a switch. The router 104 may support many communication protocols, including Internet protocol (IP), asynchronous transfer mode (ATM), and others. The router 104 may range in capacity from small to large traffic handling capability. While shown in FIG. 1 as outside the cloud representing the Internet 106, the router 104 may be considered to be inside the cloud of the Internet 106. It is well known that routers, for example the router 104, make up a substantial portion of the nodes within the cloud of the Internet 106.

The web server 134 communicates with the query tool 132 to invoke one or more status queries. The web server 134 returns the results of the status queries and/or any time rate of change data to the GUI 130. The web server 134 returns the results of the status queries with substantially a real time response. In the context of the present disclosure, a real time response is intended to mean a response time that is acceptable to most subscribers initiating a status query from the GUI 130 and waiting for the result of the status query to display on the GUI 130, for example waiting about ten seconds or less. For confirming, maintaining, and/or troubleshooting a communication service, this may be an acceptable real time response. In other embodiments, however, a longer response time may be acceptable, for example up to about one minute, and this longer response time may also be referred to as a real time response.

The web server 134 is shown communicating with the query tool 132 via the Internet 106, but in another embodiment the web server 134 may communicate with the query tool 132 by a communication path within the service provider network 105, for example over a LAN within the service provider network 105. The status queries may determine a connectivity status of the communication path 112, an interface status of the port 110, a QoS of the communication path 112, a latency of the communication path 112, and other communication service status information.

The query tool 132 may execute on a general purpose computer system in the service provider network 105 and may send a simple network management protocol (SNMP) message to the router 104 and/or to the port 110 to request appropriate data to reply to the status queries. The SNMP message may request current values of a variety of counters, for example an input error counter, an output error counter, an input packet discard counter, an output packet discard counter, an interface resets counter, a carrier transitions counter, and other well known counters. Additionally, the SNMP message may request current values of other operational parameters of the router 104 and/or the port 110, for example a current queue depth, an average queue depth, a maximum queue depth, an offered throughput rate, a packet drop rate, and other parameters. This process of obtaining values of counters and operational parameters of the router 104 and/or the port 110 may be referred to as polling the router 104 and may be accomplished by using the SNMP protocol or by another method.

In another embodiment, the query tool 132 may communicate with the router 104 and/or the port 110 using a secure shell (SSH) interface to access information from the router 104 and/or the port 110. In another embodiment, the query tool 132 may remotely connect to the router 104 and/or the port 110 by another means and run a native command on the router 104 and/or the port 110 to obtain operational parameters of the router 104 and/or the port 110. Yet other methods of obtaining the operational information from the router 104 and/or the port 110 are contemplated by this disclosure.

The query tool 132 may also initiate a ping from the router 104 to the CPE 102. The ping function is a simple communication that involves a message being sent from the router 104 to the CPE 102 and the CPE 102 returning the message back to the router 104, whereby a round trip time can be determined and connectivity confirmed at a basic level. The query tool 132 may invoke privileged commands restricted to trusted persons, privileged commands which may not be invoked directly by subscribers because of risks that network service might be accidentally degraded.

The query tool 132 may store the results of multiple queries and/or multiple pings and calculate various time rate of change quantities, for example a maximum round trip time, a minimum round trip time, and an average round trip time of a plurality of pings. These maximum, minimum, and average round trip times may provide insight into the communication latency, or time delays, in the communication path 112. The communication latency in the communication path 112 may be sensitive to different communication loads. The query tool 132 may also store the results of the different polls to determine that error rates are increasing or decreasing and/or that the number of dropped packets per unit time is increasing or decreasing.

In an embodiment, the query tool 132 may provide background information that promotes understanding of the information about the communication service provided by the query tool 132. The background information may be provided based on the information about the communication service, for example based on input errors experienced at the port 110 of the router 104. For example, the following background information may be provided when input errors are experienced at the port 110 of the router 104: "This interface has experienced input Errors in the last 99 seconds. Any input error value for cyclic redundancy check (CRC) errors, framing errors, or aborts above one percent of the total interface traffic suggests some kind of link problem that should be isolated and repaired. Input Errors indicate a circuit, cable, connector, DSU, or router hardware problem."

In an embodiment, the query tool 132 may determine a possible root cause of a condition of the communication path 112, for example increased dropped packets, and may determine a recommended network management action to take, for example increasing the class of service associated with the communication path 112. The possible root cause may be selected, based on error conditions identified through the polling activities and through analyzing the changed performance and statistics of the communication path 112, from an enumerated list of common root causes that are known to those skilled in the art. The query tool 132 may send a message containing the root cause and the recommended network management action to the customer network 103, for example to the GUI 130 where the message contents may be displayed, via the web server 134.

The CPE 102, the computer that supports the GUI 130, the computer that supports the query tool 132, and the web server 134 may be general purpose computer systems. General purpose computer systems are described in greater detail hereinafter. The LEC switch 108 may be a special purpose electronic device comprising redundant processors to provide fail-over redundancy to maintain communication service in the presence of a single processor failure, a specialized switching fabric to direct communications traffic, and a plurality of individual protocol interface boards or circuit packs. Although they may be complicated devices, switches such as the LEC switch 108 are well known to those skilled in the art. The router 104 may be implemented on a variety of computing platforms. Some routers 104 may be implemented on simple desktop computers. Some routers 104 may be implemented on general purpose computer systems. Yet other routers 104 may be implemented on computer systems having both hardware and software expressly tailored for the router environment. Routers such as the router 104 are well known to those skilled in the art.

Figure 2:
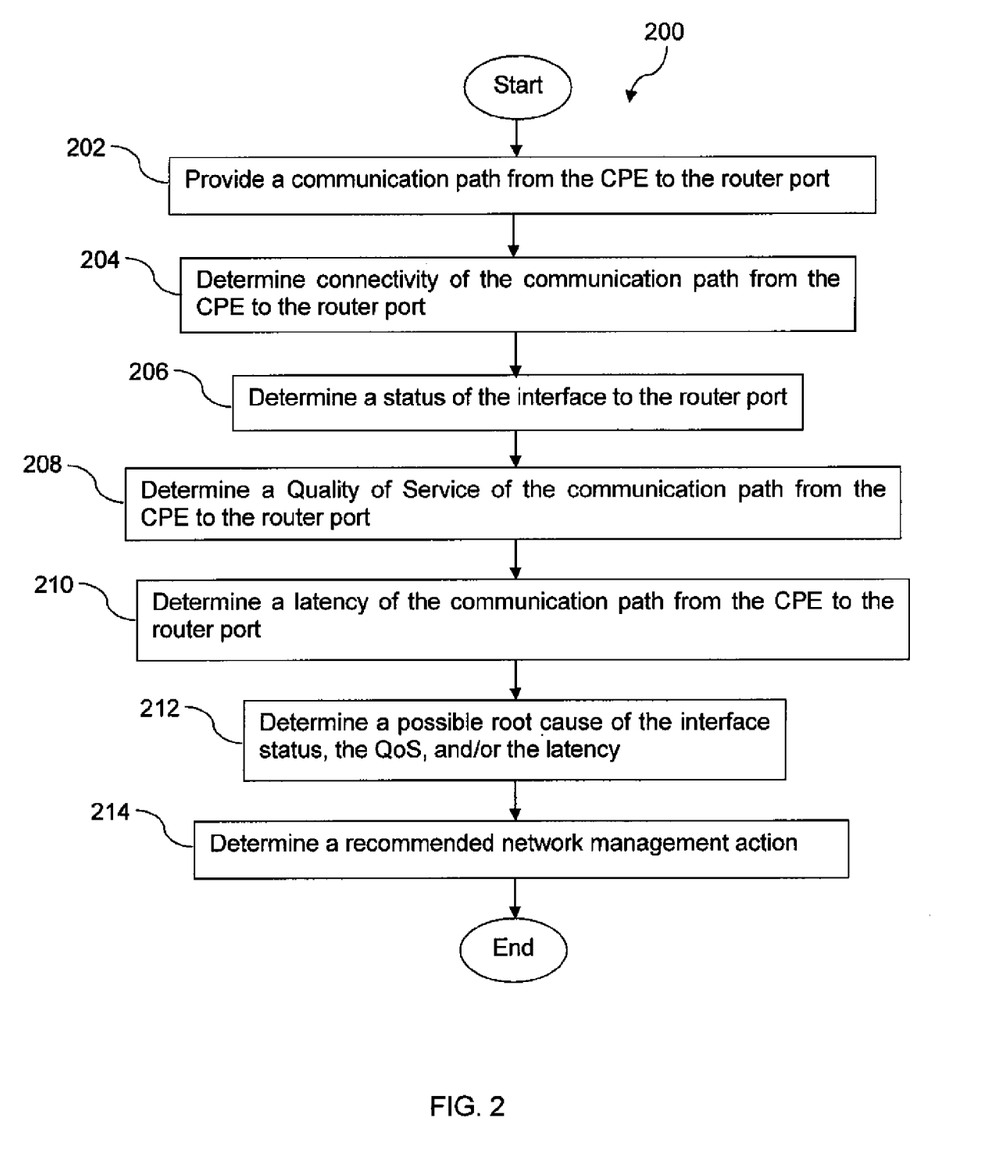
FIG. 2 is a flow chart of a method of maintaining a communication service according to an embodiment of the disclosure.

Turning now to FIG. 2, a flow chart of a method 200 for maintaining a communication service is described. The method 200 begins at block 202 where a communication path 112 from the CPE 102 to the port 110 on the router 104 is provided. This may involve provisioning the service at the router 104 and bringing the communication path 112 into service in the service provider network 105. In an embodiment, this may further involve provisioning the LEC switch 108 in the LEC network 109 to respond to messages from the CPE 102 in pre-programmed ways to switch the first link 112-A to the second link 112-B or in continually bridging the first link 112-A to the second link 112-B.

In block 204 the connectivity of the communication path 112 from the CPE 102 to the port 110 of the router 104 is determined. The connectivity may be determined by the subscriber or other person using the GUI 130 to invoke one or more functions of the query tool 132, for example the ping functionality. The subscriber may deduce whether connectivity does or does not exist from the results of the functions returned to the GUI 130, for example the results from one or more ping invocations.

In block 206 the status of the interface to the port 110 of the router 104 is determined. The status of the interface may be determined by the subscriber or others using the GUI 130 to invoke a command of the query tool 132, for example the polling function or a portion of the polling function. The subscriber may deduce the status of the interface from the polling results returned to the GUI 130.

In block 208 the QoS of the communication path 112 is determined, for example by the subscriber or other using the GUI 130 to invoke the polling function or a portion of the polling function provided by the query tool 132. The subscriber may deduce the currently provided QoS of the communication path 112 based on the polling results returned to the GUI 130.

In block 210 the latency of the communication path 112 based on a known communication traffic load is determined. For example the subscriber or other may use the GUI 130 to invoke the ping functionality of the communication service status tool 132 several times in succession while a known or calibrated communication traffic load is present on the communication path 112. In this manner, the maximum round trip time, average round trip time, and minimum round trip time may be determined by the communication service status tool 132 and reported to the GUI 130. In some cases the latency of the communication path 112 may be determined with a low communication traffic load.

In block 212 a possible root cause is determined of one or more of the status of the interface to the router port 110, the QoS of the communication path 112, the latency of the communication path 112, or other condition of the communication service. The query tool 132 may identify the possible root cause from an enumerated list of common root causes based on polling the router 104 and/or the port 110, for example based on time rate of change quantities calculated or determined by the query tool 132.

In block 214 a recommended network management action is determined based on the possible root cause determined in block 212. For example, if excessive dropped packets are counted, the possible root cause may be identified as insufficient bandwidth and/or throughput of the communication path 112 and/or the communication service, and the recommended network management action may be to upgrade the class of service and/or the SLA of the communication service.

Through the process 200, the subscriber or another may determine the current real time condition and status of the communication path 112 and determine maintenance actions to perform to return the communication service to a desired level of performance and/or to verify the level of performance of the communication service. For example, if the QoS status information indicates that the current queue depth equals the maximum queue depth and the QoS level is the default service, the subscriber may deduce that they may be overloading the communication path 112 and losing data packets. The subscriber, in this example, may determine the appropriate maintenance action is to upgrade their SLA with their Internet service provider to better accommodate their actual communication traffic load.

One or more of the functions of the query tool 132 may be invoked to determine the condition of the communication service and/or the communication path 112 in real time. As described above, in the context of the present disclosure, a real time response is intended to mean a response time that is acceptable to most subscribers.

Figure 3:
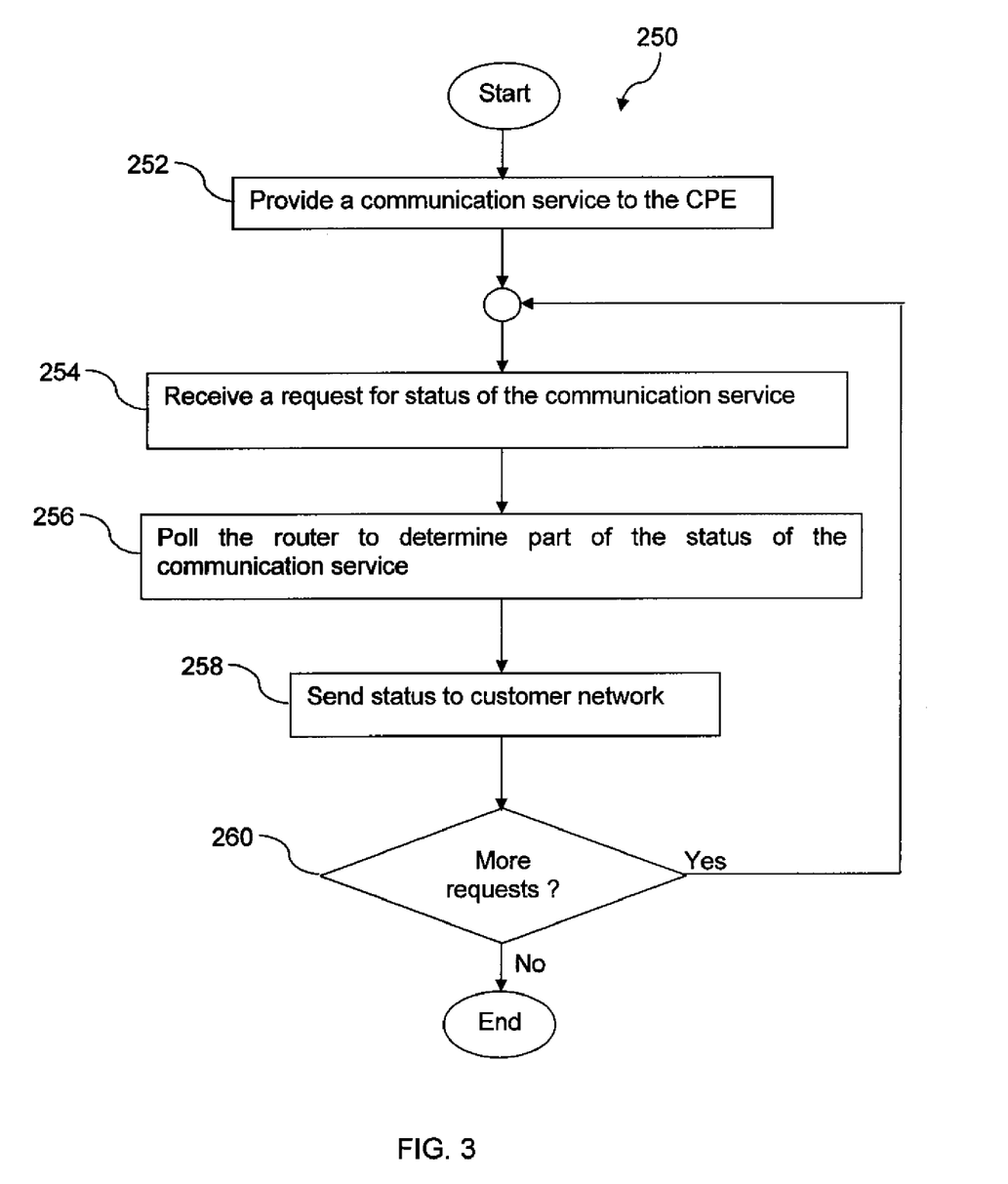
FIG. 3 is a flow chart of a method of troubleshooting a communication service according to an embodiment of the disclosure.

Turning now to FIG. 3, a flow chart of a method 250 for troubleshooting a communication service is described. The method 250 begins at block 252 where a communication service, for example a VPN, is provided by the service provider. In an embodiment, the VPN may be provided by the port 110 on the router 104 to the CPE 102 via the communication path 112.

In block 254 a request for the status of the communication service is received, for example by the web server 134 in the service provider network 105. The request for the status may include a request for one or more of an interface status of the port 110, a plurality of counters associated with the port 110 and/or the router 104, and a connectivity status of the communication path 112.

In block 256 the router 104 and/or the port 110 are polled to determine the requested status of the communication service. This may involve the web server 134 calling a method of an application programming interface (API) of the query tool 132 to cause the query tool 132 to initiate the poll for status of the router 104 and/or the port 110. This poll may involve privileged and/or limited access commands available only to entities with high level privileges, for example a superuser privilege or a root privilege in a UNIX operating system. The poll may be accomplished by sending a SNMP message to the router 104 and/or the port 110 to provide the requested status information. The poll may involve requesting the router 104 and/or the port 110 to execute a ping or a plurality of pings to the CPE 102 to determine communication round trip times between the port 110 and the CPE 102.

In block 258 the status of the router 104 and/or the port 110 is returned, for example to the customer network 103, for example the GUI 130. Based on the status of the router 104 and/or the port 110, the subscriber may troubleshoot the communication service.

In block 260 if more status requests are desired, for example if a troubleshooting session remains active, the method 250 returns to block 252, otherwise the process 250 completes. The determination of status in block 256 may include comparing previous results to current results of the polling of the router 104 and/or the port 110 to determine senses of change of key performance indicators, for examples increases or decreases of current queue depth, and/or time rate of change in key performance indicators. In an embodiment, an excess of status requests may be detected and discarded, for example by the web server 134 or by the query tool 132 to prevent overloading either the router 104 and/or the port 110 and overloading the customer network 103 with excessive responses.

Figure 4:
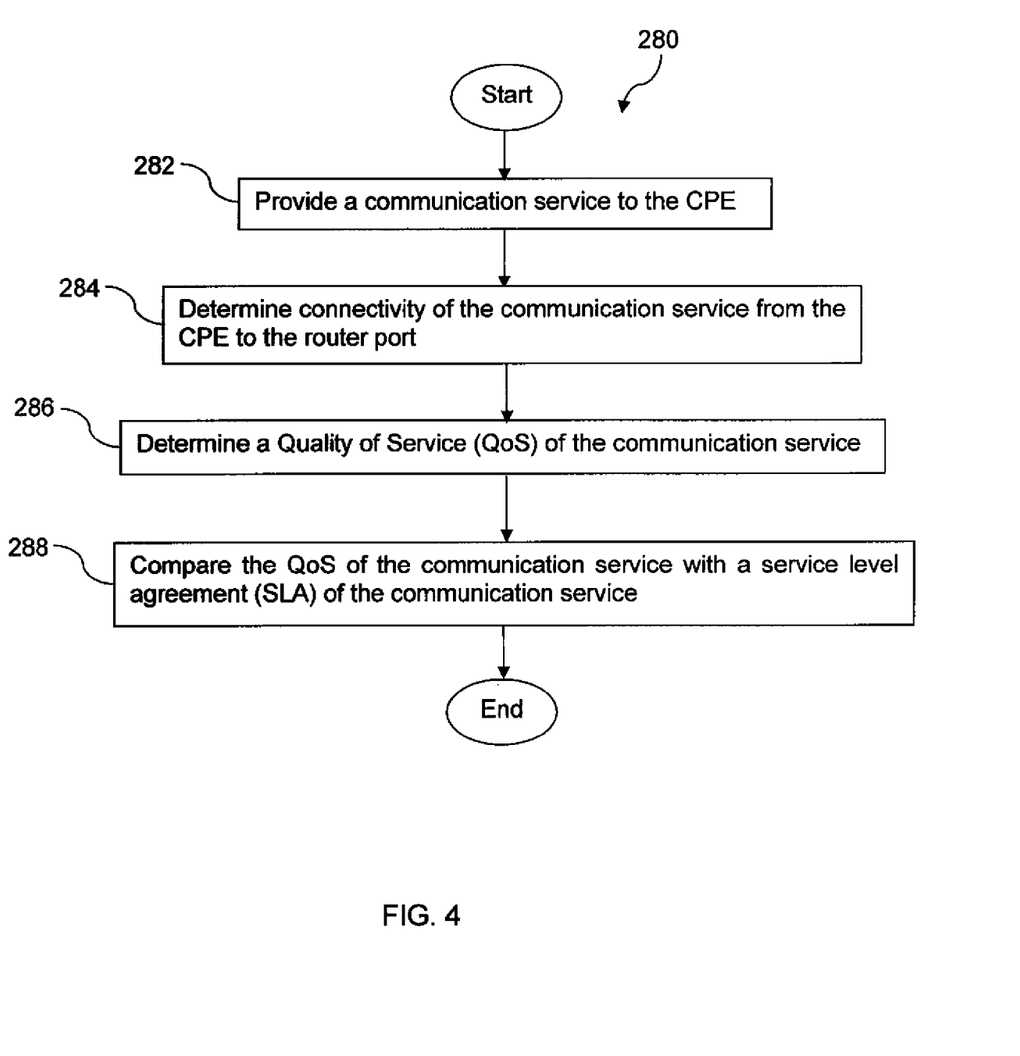
FIG. 4 is a flow chart of a method of confirming a communication service according to an embodiment of the disclosure.

Turning now to FIG. 4, a flow chart of a method 280 for verifying a communication service is described. The process 280 begins at block 282 where a communication service, for example a VPN based on multi-protocol label switching (MPLS), is provided by the service provider. In another embodiment, a different communication service may be provided, for example a video conferencing service, an email service, or other communication service. In an embodiment, the communication service may be provided by the port 110 on the router 104 to the LEC switch 108 to the CPE 102 via the communication path 112. When the communication service is first brought into service, for example by an Internet service provider provisioning the communication service, the subscriber may wish to assure or verify the communication service.

In block 284 the subscriber determines the connectivity of the communication service from the CPE 102 with the port 110 of the router 104, for example by using the GUI 130 to invoke one or more functions of the query tool 132. The subscriber can infer the connectivity or disconnectedness of the communication service from the results received by the GUI 130.

Assuming connectivity of the communication service is established, the method 280 proceeds to block 286 where the subscriber determines the QoS of the communication service, for example by establishing a known communication load on the communication service, for example on communication path 112, and using the GUI 130 to invoke the QoS function of the query tool 132. The subscriber can determine the QoS currently provided by the communication service based on the response provided to the GUI 130.

In block 288 the QoS of the communication service under the known communication traffic load is compared to the SLA associated with the communication service. If the observed or inferred QoS of the communication service meets or exceeds the SLA associated with the communication service, the subscriber has confirmed the communication service contracted for with the Internet service provider. If the observed or inferred QoS does not meet the SLA associated with the communication service, the subscriber may call this to the attention of the Internet service provider to obtain upgraded communication service, to fix a communication problem, or to interwork with the LEC to fix a communication problem.

In an alternative scenario, the QoS may meet the SLA associated with the communication service, but the QoS may not be adequate to the known communication load placed upon the communication path 112. In this case, assuming the known communication load is typical of the communication needs of the subscriber, the subscriber may decide to upgrade their communication service. It may be common for subscribers to underestimate their communication needs and experience poor communication services as a result of an under scoped SLA. The system and method of the present disclosure may provide transparency into the communication service which promotes the subscriber right sizing the SLAs associated with their communication services.

One skilled in the art will readily understand that the method depicted in FIG. 4 may be useful to employees of the provider of the communication service, for example customer facing employees of the provider of the communication service, and may amend the method description above to be practiced by the employees of the provider of the communication service.

Figure 5:
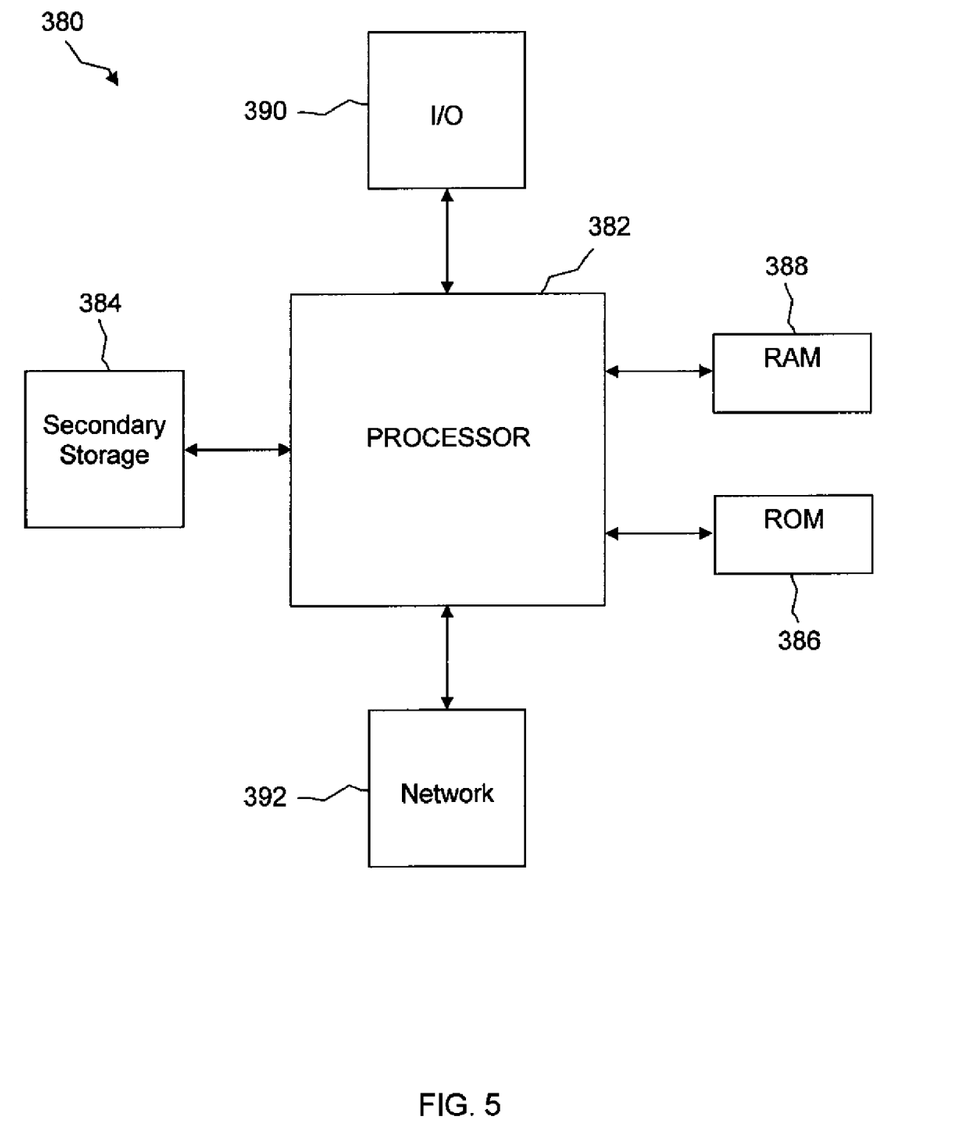
FIG. 5 is an illustration of an exemplary general purpose computer system suitable for implementing the several embodiments of the disclosure.

Some portions of the system 100 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, key-boards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of maintaining a communication service, comprising:

providing a communication path from a customer premises equipment (CPE) in a customer network to a port of a router located in a communication service provider network, wherein the port is allocated to the CPE, and wherein the customer network is different from the communication service provider network;

receiving one or more status queries by a query tool in the communication service provider network based on a request from a user interface presented by a computer in the customer network coupled to the CPE;

polling the port of the router by the query tool in response to the query tool receiving the one or more status queries, the polling obtains operational parameters of the port;

returning the operational parameters of the port obtained by the query tool to the user interface;

determining based on the operational parameters of the port returned to the user interface a connectivity of the communication path from the CPE in the customer network to the port of the router in the communication service provider network;

determining based on the operational parameters of the port returned to the user interface a status of an interface to the port of the router in the communication service provider network; and determining based on the operational parameters of the port returned to the user interface a quality of service (QoS) of the communication path from the CPE to the port of the router in the communication service provider network.

2. The method of claim 1, wherein determining the connectivity and the QoS of the communication path and determining the status of the interface is performed in real time.

3. The method of claim 1, further including determining by the query tool a possible root cause of one of the status of the interface and the QoS of the communication path and determining a recommended network management action based on the possible root cause.

4. The method of claim 1, further including determining a latency of the communication path, wherein determining the latency is initiated via a status query invoking a ping functionality of the query tool in the communication service provider network, and wherein the latency of the communication path is based, at least in part, on a round trip time of one or more pings initiated by the query tool from the port of the router to the CPE and back to the port of the router.

5. The method of claim 4, wherein the determining the latency includes determining a maximum round trip time, a minimum round trip time, and an average round trip time of a plurality of pings.

6. The method of claim 1, wherein determining the QoS is based on the operational parameters of the port of the router including at least one of a current router port queue depth, an average router port queue depth, an offered throughput rate, and a drop rate.

7. The method of claim 1, wherein the operational parameters of the port returned to the user interface comprise counter values of the port, and wherein determining the interface status of the port on the router is based on the counter values of the port of the router, wherein the counter values include at least one of a count of input packet discards, a count of output packet discards, a count of input errors, a count of output errors, and a count of interface resets.

8. The method of claim 1, wherein the user interface executes on a computer in the customer network.

9. The method of claim 1, wherein polling the port of the router by the query tool further comprises initiating a ping by the query tool from the router to the CPE.

10. The method of claim 1, wherein the time between receiving the one or more status queries and returning the operational parameters of the port of the router obtained by the query tool to the user interface is less than about ten seconds.

11. The method of claim 1, wherein the communication service comprises a virtual private network (VPN) functionality based on multi-protocol label switching (MPLS).

12. The method of claim 1 further comprising comparing the QoS of the communication path with a service level agreement (SLA) associated with the communication service, thereby confirming the communication service, wherein determining the connectivity and the QoS of the communication path are initiated by a subscriber of the communication service.

13. The method of claim 12, wherein the subscriber of the communication service initiates determining the connectivity and QoS of the communication services by clicking on a button presented by the user interface that causes an asynchronous JAVASCRIPT request (AJAX) to be sent to a web server in the communication service provider network, wherein executing the AJAX request on the web server causes a simple network management protocol (SNMP) message to be sent from the query tool to the port of the router to obtain the operational parameters of the port of the router, and wherein the port of the router replies to the SNMP message by returning an SNMP message containing the operational parameters of the port of the router.

14. The method of claim 1, wherein the user interface executes on a computer in the service provider network.

15. The method of claim 1, further including the query tool determining the condition of the communication service in real-time in response to invocation.

\* \* \* \* \*